United States Patent
Abbrancati

[19]

[11] Patent Number: 6,099,201
[45] Date of Patent: Aug. 8, 2000

[54] PAVEMENT EDGING

[76] Inventor: Guiseppe Abbrancati, 311 Veterans Memorial Hwy., Commack, N.Y. 11725

[21] Appl. No.: 09/116,824

[22] Filed: Jul. 16, 1998

[51] Int. Cl.[7] ..................................... E01C 11/22
[52] U.S. Cl. ......................... 404/7; 404/4; 47/33; 52/102
[58] Field of Search ................... 404/7, 18, 28, 404/31, 36, 43, 4, 6; 47/33; 52/102

[56] References Cited

U.S. PATENT DOCUMENTS

| | | | |
|---|---|---|---|
| 4,074,479 | 2/1978 | Krupka | 47/33 |
| 4,349,596 | 9/1982 | Hendrix | 428/83 |
| 4,381,622 | 5/1983 | Spidell | 47/33 |
| 4,663,883 | 5/1987 | Hilliard et al. | 47/33 |
| 4,863,307 | 9/1989 | Jones | 404/7 |
| 5,073,061 | 12/1991 | Jones | 404/8 |
| 5,212,917 | 5/1993 | Kurtz et al. | 47/33 |
| 5,259,154 | 11/1993 | Lilley | 404/7 |
| 5,317,833 | 6/1994 | Goldman | 404/7 |
| 5,377,447 | 1/1995 | Fritch | 47/33 |
| 5,456,045 | 10/1995 | Bradley et al. | 47/33 |
| 5,544,445 | 8/1996 | Mantilla | 52/102 |
| 5,638,635 | 6/1997 | Palladino | 47/33 |
| 5,640,801 | 6/1997 | Rynberk | 47/33 |
| 5,720,128 | 2/1998 | Smith et al. | 404/7 |
| 5,769,562 | 6/1998 | Jones | 404/7 |
| 5,857,288 | 1/1999 | Wiste | 47/33 |

*Primary Examiner*—Thomas B. Will
*Assistant Examiner*—Kristine Markovich
*Attorney, Agent, or Firm*—Bauer & Schaffer, LLP

[57] ABSTRACT

A pavement edging for maintaining the integrity and straight longitudinal edge of a concrete pavement constructed from a plurality of concrete bricks. The pavement edging having an elongated body with a front wall, a rear wall and a plurality of interposed longitudinal and transverse walls forming a generally egg crate construction.

15 Claims, 4 Drawing Sheets

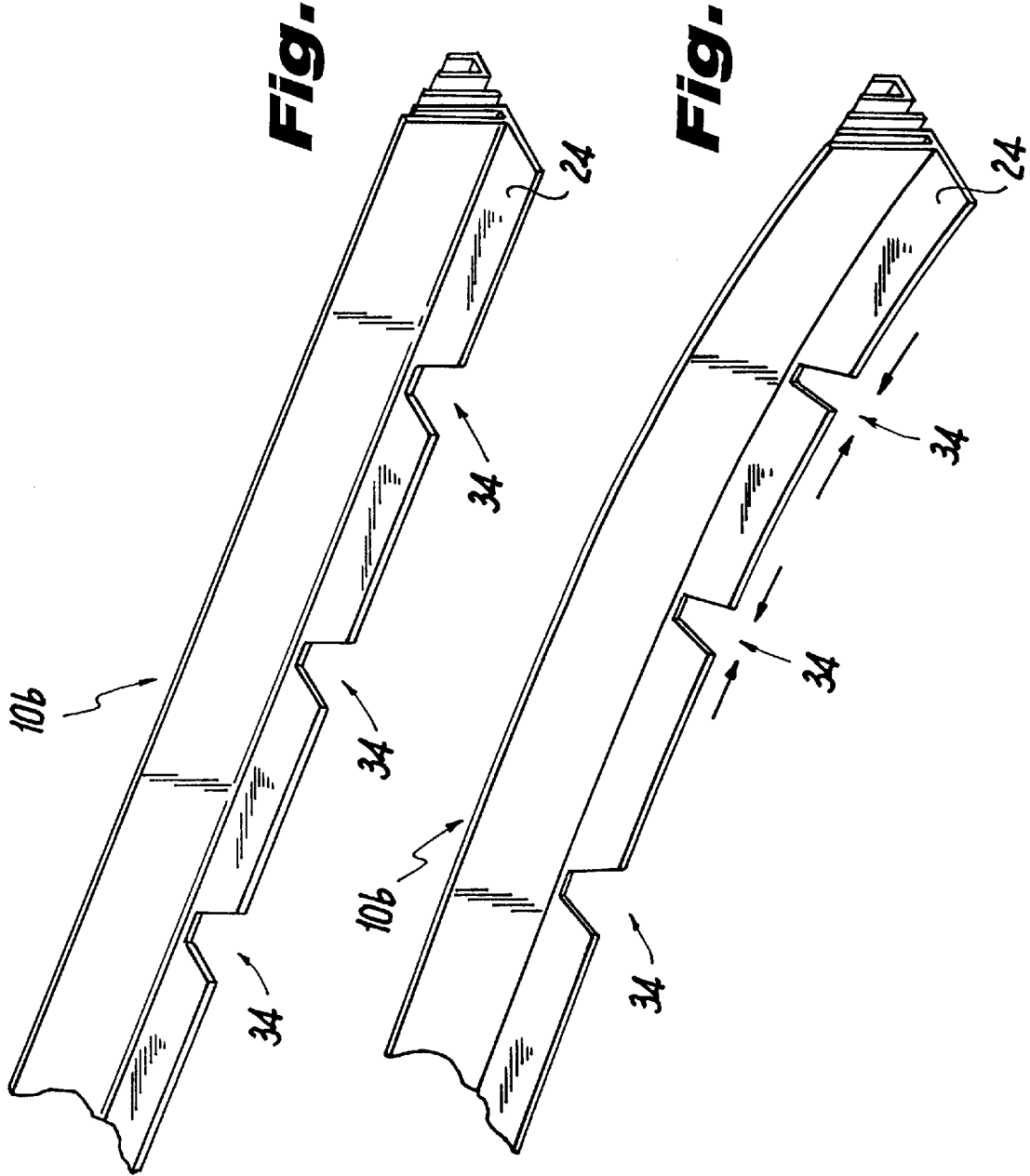

PAVEMENT EDGING

BACKGROUND OF THE INVENTION

The present invention relates to an improvement in pavement edging, and, in particular to an improved pavement edging for use with concrete paving bricks.

Conventionally when a surface is paved with a plurality of concrete bricks (1) a predetermined amount of base material such as crushed concrete or the like is laid as a base on top of a prepared ground surface; (2) a predetermined amount of sand is laid on top of the base material to create a smooth surface upon which to lay the bricks and then (3) a plurality of bricks in the decorative layout is installed. Along the edge of the layout, where the paved surface abuts the lawn or other surface the paver lays an edging material that is intended to provide a straight peripheral edge while at the same preventing the bricks from shifting over time.

Conventional edging strips usually consist of an elongate member having a generally L shaped body, designed such that the shorter horizontal wall of the strip body fits under the outer most brick of the paved surface and the longer vertical wall interfaces the paved surface and the lawn. However, because only a small portion of the edging material is secured under the paved surface these edging systems have a tendency to shift over time as the bricks settle resulting in a inconsistent peripheral edge.

Conventional edging strips of the type referred to are constructed from a flexible rubber or plastic material to allow the strip to be shipped in large rolled quantities and to improve workability. However, these materials offer little transverse stability making them ill-suited for maintaining the bricks in proper alignment.

Another problem found in conventional edging systems is that the grass lawn along the edge of the paved surface often does not grow properly. Because the synthetic edging material is impervious to water the grass along the edge of paved surface is not properly nourished resulting in an inconsistent and unattractive transition between the lawn and the paved surface.

Finally, because of their limited transverse stability conventional edging systems of the type described are used only for smaller residential projects and are particularly ill-suited to larger commercial projects. As a result, conventional edging systems are limited in their versatility and general purpose utility.

It is, therefore, an object of the present invention to provide an improved pavement edging that overcomes the shortcomings and limitations of the prior art.

It is another object of the present invention to provide a pavement edging that offers improved transverse stability.

It is still another object of the present invention to provided a pavement edging that permits proper lawn growth along the edge of the paved surface.

It is a further object of the present invention to provide a pavement edging that is useful for both residential and industrial applications.

SUMMARY OF THE INVENTION

A pavement edging for insuring the integrity of a pavement constructed of a plurality of concrete bricks or the like and maintaining a straight longitudinal edge along the periphery of the pavement. The pavement edging having an elongated body with a horizontal bottom wall with a front and rear terminal edge, a vertical front wall offset from the front terminal edge and extending vertically therefrom to form a leading horizontal front lip, a vertical rear wall extending from the rear terminal edge and a plurality of transverse and longitudinal walls interposed between the front and rear wall to form a generally egg crate construction.

BRIEF DESCRIPTION OF THE DRAWINGS

In the drawings:

FIG. 5 is a perspective view of an alternate embodiment of the pavement edging according to the present invention;

FIG. 6 is a similar view shown in FIG. 5 showing the manner in which the pavement edger may be curved;

DETAILED DESCRIPTION OF THE PRESENT INVENTION

Figure 1:
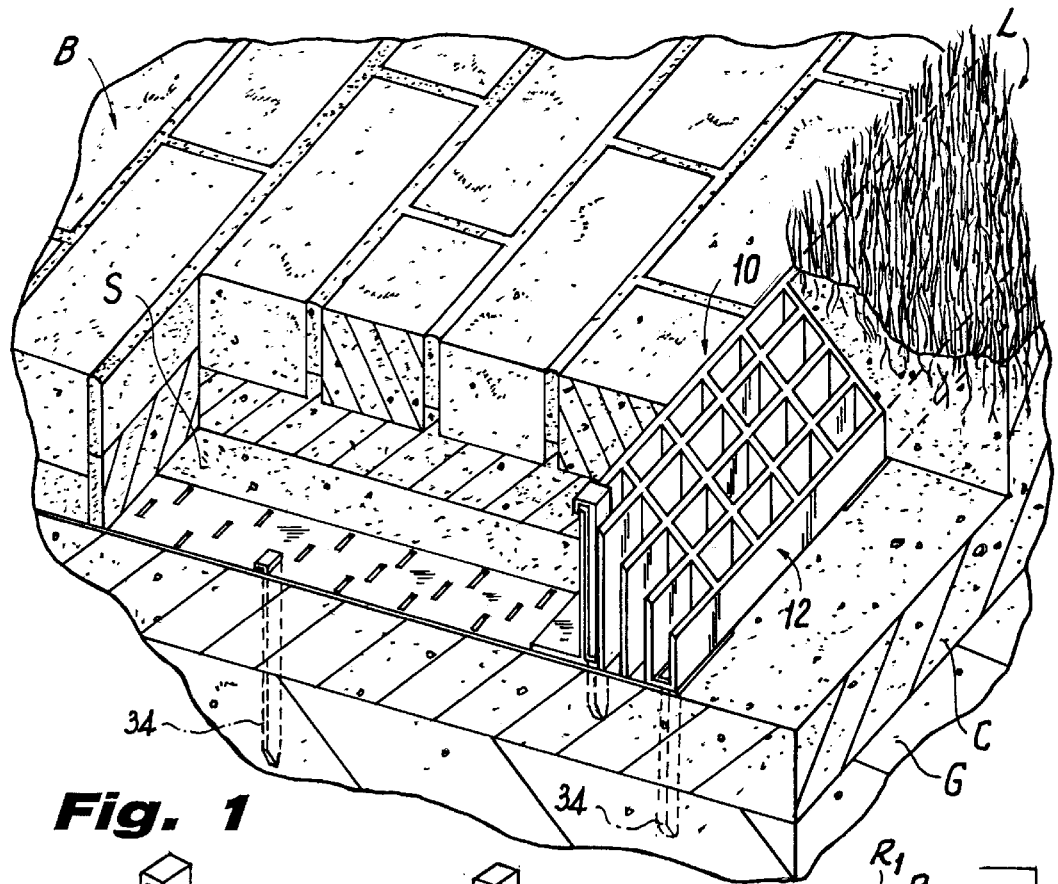
FIG. 1 illustrates the pavement edging according to the present invention as installed with a brick pavement.

In FIG. 1, a plurality of concrete bricks B aligned in pavement pattern are laid on a prepared base. The base comprises a first layer C consisting of crushed concrete, gravel and a second layer of sand S laid on top of a level ground G. The bricks abut on both sides against a stretch of lawn L. As so far described, the installation is conventional and quite common in the art.

In order to maintain the integrity of the pavement and the maintenance of a straight longitudinal edge, a pavement edging according to the present invention, generally depicted by the numeral 10, is interposed between the bricks B and the lawn L along both longitudinal edges of the paved surface. For purposes of simplicity a single pavement edging 10 is shown in FIG. 1, however it is appreciated that an edging according to the present invention would be installed along both longitudinal edges of the paved surface in use.

Figure 2:
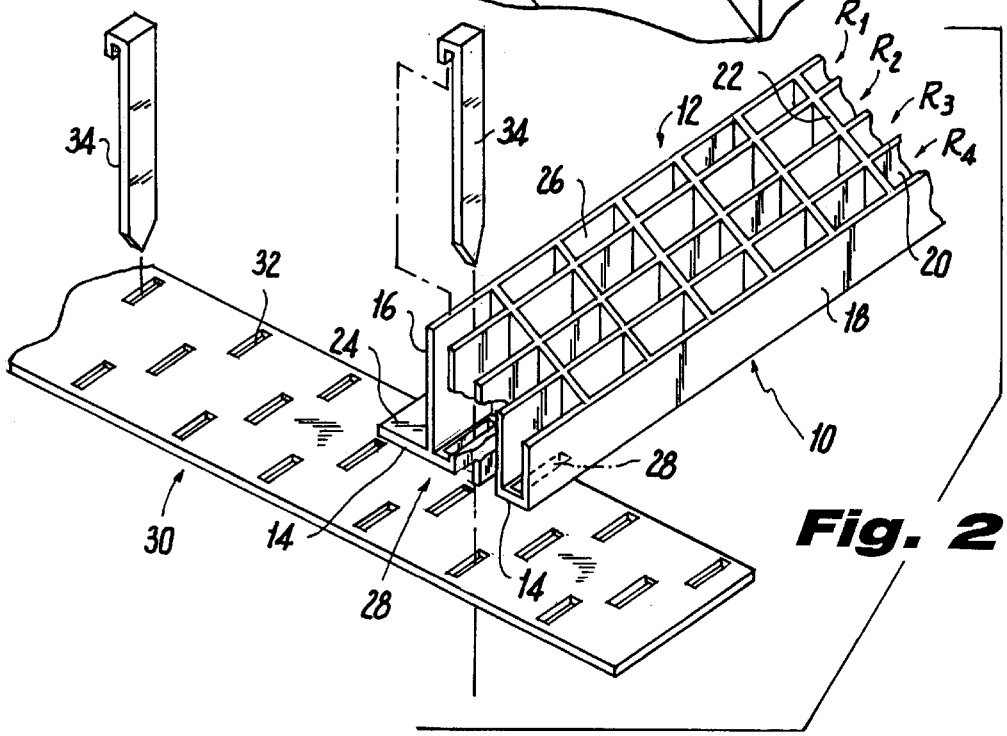
FIG. 2 is exploded perspective view of the edging in FIG. 1 in combination with a transverse belt member.

As seen in FIGS. 1 and 2, the pavement edging according to the present invention comprises a buttress, generally depicted the numeral 12, having a horizontal bottom wall 14, a vertical front wall 16 facing the bricks, a vertical rear wall 18 facing the lawn and a plurality of longitudinally and transversely arranged interior walls 20 and 22 interposed between the front and rear walls 18, forming the egg crate construction as seen.

The front wall 16 is higher than the rear wall 18 and the longitudinal interior walls 20 are graduated in height giving the buttress a smooth slope from front to rear. The front wall 16 is offset back from the innermost terminal edge of the bottom wall so that the bottom wall forms an extended lip 24. The rear wall 18 extends vertically from the outermost terminal edge of the bottom wall as seen.

The longitudinal and transverse walls 20 and 22 act collectively to form a plurality of chambers or cavities 26 arranged in rows $R_1$, $R_2$, $R_3$ and $R_4$. Within each of the chambers or cavities 26 in row $R_1$, adjacent the front wall, the bottom wall is provided with a slot 28. The slots 28 are located at the base of the front wall 16 as seen. Likewise, within each of the cavities in outermost row $R_4$, the bottom wall is provided with a through slot 28. As best seen in FIG. 2, the bottoms of the chambers in rows $R_2$ and $R_3$ are preferable left open, that is, the bottom wall 14 is fragmented such that it does not extend completely from the rear wall 18 to the front wall 16. By omitting the bottom wall from the interior section of the buttress, the overall weight of the buttress is reduced improving workability. The pavement edging 10 is preferably constructed from a durable synthetic material such as a flexible plastic or the like.

In use of the present invention, a base layer C laid over a level ground G in a conventional manner. The pavement edging 10 according to the present invention is then laid so that the buttress 12 is placed in a interposed position between where the edge of the pavement layout will be and the edge of the lawn surface L. The buttress 12 is then secured in place by driving a stake through each of the slots 28 located in the outermost row of the buttress, row $R_4$ and/or any of the slots 28 located in the innermost row, row $R_1$.

Figure 3:
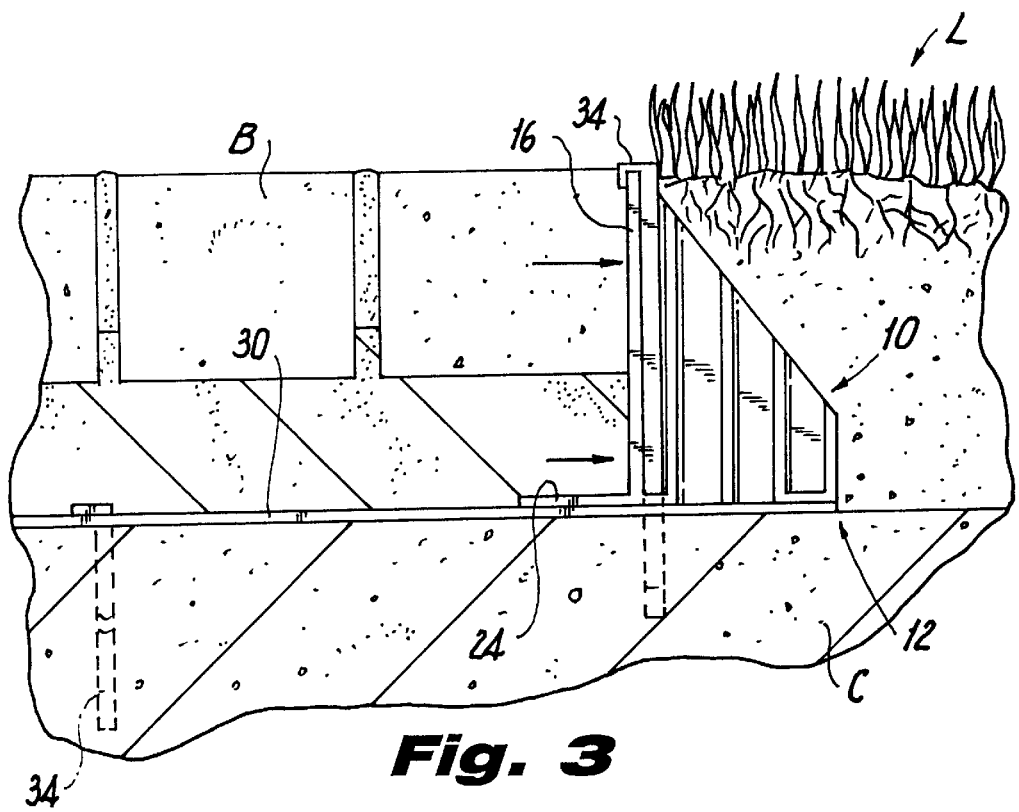
FIG. 3 is side elevational view of the pavement edging.

A second layer of sand S is then laid over the base layer C and the front lip 24 of the buttress as seen in FIGS. 1 and 3. On top of the layer of sand S is then laid the plurality of bricks B forming the pavement layout. The bricks along the edge of the layout are arranged so that they abut the buttress 12 along the interior surface of the front wall 16 and are positioned above the front lip 24. In this manner, the weight of the bricks acting on the front lip 24 aid in preventing the buttress from moving or sliding out of position, thereby insuring the integrity of the pavement and the maintenance of a straight longitudinal edge.

After the bricks are arranged, the buttress may be back filled with soil from the lawn L. The chambers 26 within the buttress receive and retain the soil or other back fill material. By back filling the buttress, the buttress is further anchored insuring additional transverse stability. In addition, by back filling the buttress with the lawn soil, the lawn is able to grow in a uniform attractive manner along the edge of the pavement surface. The partially open bottom wall further promotes proper lawn growth by allowing water and nutrients to pass through the buttress and nourish the roots of the grass. For industrial, or other large high traffic applications, where superior transverse stability is required concrete or the like may be used as the back fill material in lieu of soil.

Should additional security be desired a transverse belt 30 may be interposed between the concrete base C and the layer of sand S as seen in FIG. 1. The transverse belt comprises an elongate sheet constructed of a durable synthetic material such as PVC or the like. Preferably, the dimensions of the sheet are approximately ¼" thick and about 2" wide. These dimensions of course may be varied as desired depending upon the needs of a particular application. Uniformly arranged along the length of the of the belt 30 are a plurality of through holes or slots 32.

In use, a plurality of belts are laid in the transverse direction at predetermined intervals along the length of the pavement surface. Each belt that is laid is secured to the ground by driving a plurality of stakes 34 through the holes 32 and into the ground surface. The buttress 12 is then laid in the desired location on top of the transverse belt 30. The buttress 12 is positioned on the belt so that the slots 28 in the bottom wall of the buttress align with the holes 32 in the belt as shown in FIG. 2. A stake 34 is then driven through the hole 32 and slot 28 so that the buttress and belt are secured together as best seen in the exploded view of FIG. 2. As seen the head of the stake 34 may be configured such that it conveniently folds over the front wall 16 as shown. Alternatively, any staking means may be used.

Preferably a belt 30 is laid transversely in such a manner that it is of sufficient length to travel from one longitudinal edge of the paved surface to other longitudinal edge. In this way, the belt may be secured at one end to a first buttress in the manner described above and its opposite end a second buttress. In this way, the belt is securely fastened to both buttresses along either longitudinal edge of the paved surface thereby anchoring them both in a integral manner.

As shown in FIGS. 1 and 2, the dimensions of the chambers in row 1 are preferably sized such that the stake 34 fits snugly therein. This helps prevent the stake 34 from being dislodged or otherwise disengaging.

A layer of sand S and bricks B are then laid on top of the belt in the manner described above. Any excess belt material that extends beyond the buttress can be simply cut off.

The function of belt is to create a integral edging system that is highly resistive to deformation. The bricks located over the belt served to anchor the belt, and thus the buttress 12 that is secured to the belt. This configuration utilizes the weight of the bricks located on the interior of the paved surface, in addition to the weight of the bricks located along the edge of the paved surface, to anchor the entire system. This results in a edging system that provides superior transverse stability.

Figure 4:
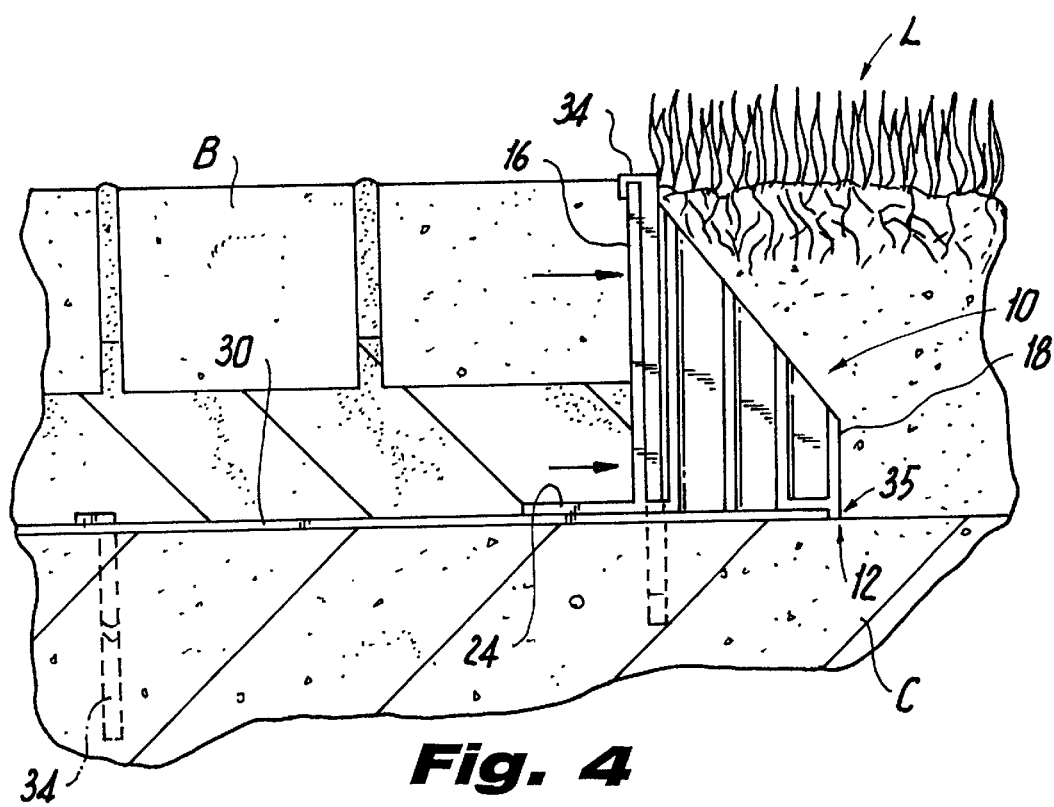
FIG. 4 is a side elevational view of the pavement edging according to the present invention with an extended rear wall.

As seen in FIG. 4, the rear wall 18 of the pavement edging may be extended beyond the lower surface of the bottom wall 14 to form an overhanging rear lip 35. The rear lip 35 allows the buttress to be snugly abutted against the terminal end of the belt 30 as shown, thereby insuring a snug fit between the belt 30 and buttress 12.

An alternate embodiment of the pavement edging according to the present invention, generally depicted by the numeral 10b is shown in FIGS. 5 and 6. In this embodiment, the front lip 24 is provided with a plurality of generally v-shaped cut outs 34 located at predetermined intervals along its length. The cut outs 34 enable the buttress 12 to be more easily bent or curved, as depicted in FIG. 5. This permits the buttress to be manipulated as required when used with a curved or round pavement surface.

Figure 7:
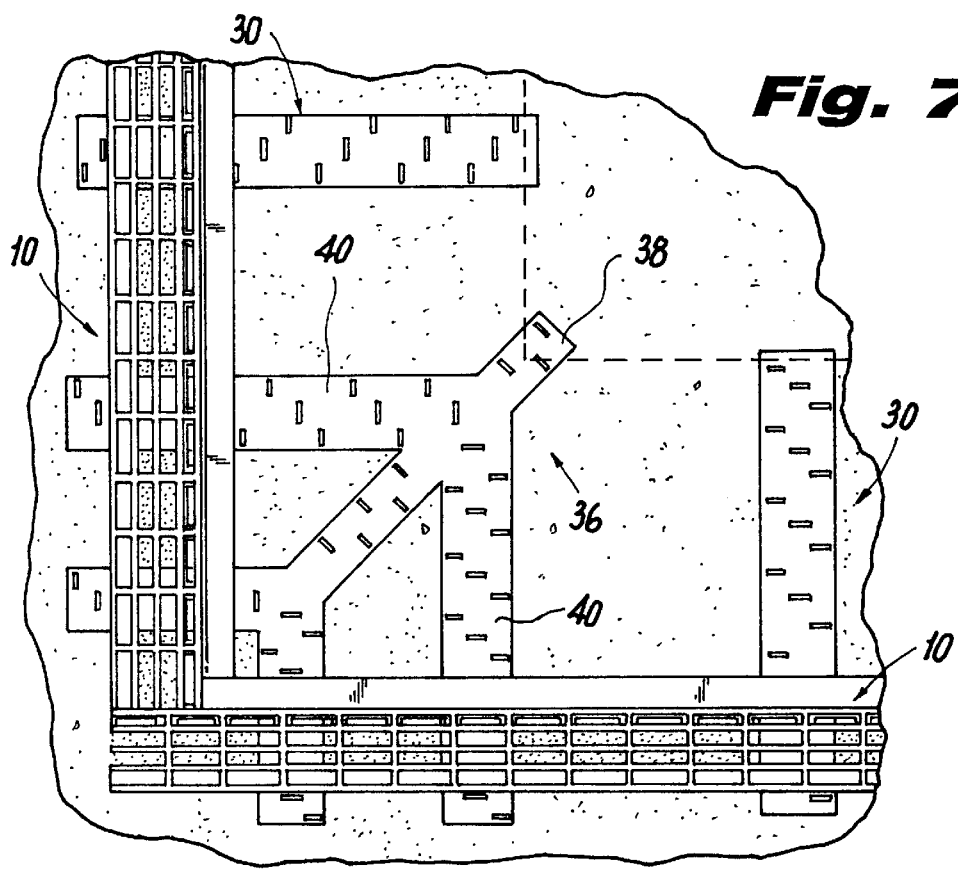
FIG. 7 is a top elevational view of a prepared layout including a branched cornering belt.

As seen in FIG. 7, a branched corner belt 36 may be employed when a ninety-degree corner is desired. The corner belt 36 is configured such that a plurality of branches 40 extend outwardly from a central stem 38. The corner belt 36 is installed such that stem 38 bisects the angle formed by the edging members 10 and radiates inwardly toward the center of the paved surface. The branches 40 extend outwardly from the central stem and are secured to the edging members 10 by stakes or the like in the manner described with respect to the transverse belt members 30. That is, that through slots 34 in the belt are aligned with the slots 28 in the edging member 10 and the two are secured by driving a stake or like through the slots and into the ground.

Figure 8:
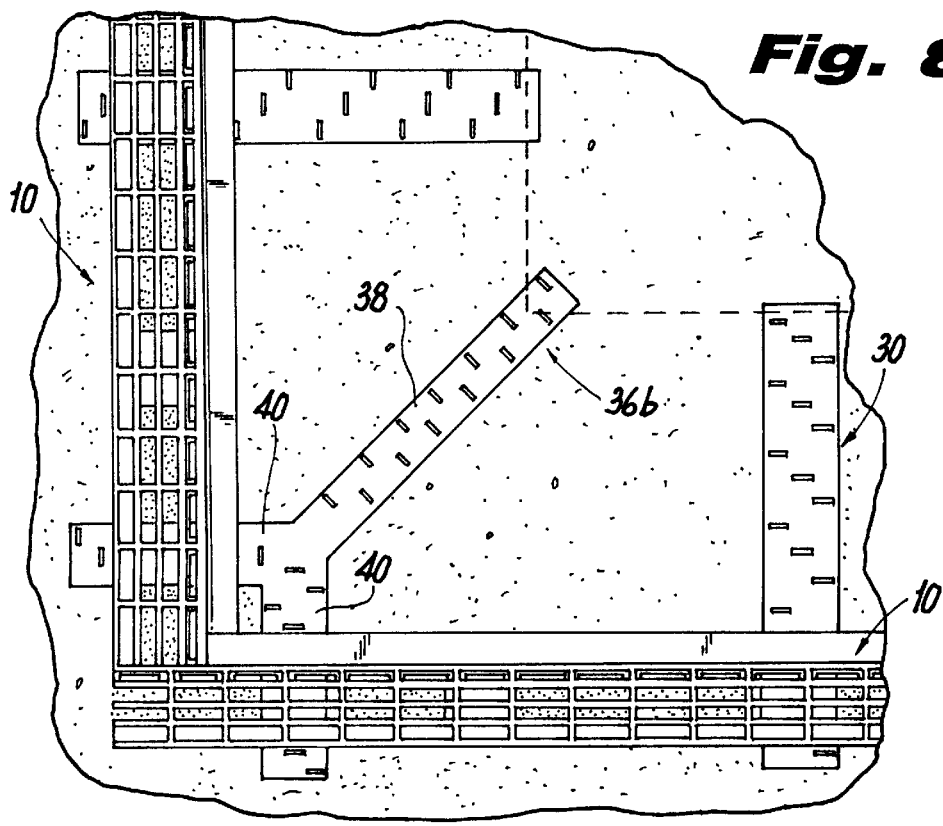
FIG. 8 is a top elevational view of a prepared layout including an alternate embodiment of the branched cornering belt.

The corner belt 36 allows two edging members 10 to be secured in a unitary fashion when a ninety-degree corner is desired. An alternate embodiment 36b of the corner belt is shown in FIG. 8. In this embodiment only two outwardly extending branches 40 are employed. Other embodiments of the corner belt employing different branch configurations will be obvious to those skilled in the art.

As seen from the foregoing, a pavement edging is provided that insures the integrity of the pavement and the maintenance of a straight longitudinal edge. Furthermore, the pavement edging according to the present invention provides superior transverse stability to conventional edging systems. Additionally, the pavement edging permits proper lawn growth along the edge of the paved surface thereby insuring a smooth transition from the lawn surface to the paved surface. Finally, the pavement edging is versatile in function and may be used in for both small residential projects and larger industrial applications.

Various modifications and changes of the present invention have been disclosed herein and others will be apparent to those skilled in this art. Therefore, it is to be understood that the present disclosure is by way of illustrating and not limiting the present invention.

What is claimed is:

1. A pavement edging comprising an elongated buttress having a horizontal bottom wall with innermost and outermost terminal edges, a vertical front wall offset from said innermost terminal edge and extending therefrom so as to form a front lip, a vertical rear wall extending from said outermost terminal edge and a plurality of transverse and longitudinal interior walls interposed between said front and rear walls.

2. The pavement edging according to claim 1, wherein said transverse and longitudinal walls form a plurality of chambers.

3. The pavement edging according to claim 2, wherein said chambers are arranged in a plurality of rows, one of said rows being adjacent said front wall and another of said rows being adjacent said rear walls.

4. The pavement edging according to claim 3, wherein said bottom wall is provided with a plurality of spaced through slots along the length thereof, each of said slots being located within one of said chambers in the row adjacent the rear wall.

5. The pavement edging according to claim 4, wherein the bottom wall is provided with a plurality of spaced slots along the length thereof, each of said slots being located within one of said chambers in the row adjacent the front wall.

6. The pavement edging according to claim 5, wherein said transverse and longitudinal walls are progressively graduated in height from said front wall to said rear wall.

7. The pavement edging according to claim 6, said front lip having a plurality of shaped cut outs spaced along its length.

8. A pavement edging system for a paved surface comprising:

a pavement edging comprising at least one elongated buttress located along at least one side of the paved surface having a horizontal bottom wall with innermost and outermost terminal edges, a vertical front wall adjacent said innermost terminal edge, a vertical rear wall extending from said outermost terminal edge and a plurality of transverse and longitudinal interior walls interposed between said front and rear walls to form a plurality of chambers; and an elongated belt, one end of said belt being interconnected to said at least one buttress and the other end of said belt passing underneath said paved surface.

9. The pavement edging system according to claim 8, wherein said bottom wall is provided with a plurality of spaced through slots located within at least one of said chambers.

10. The pavement edging system according to claim 9, wherein said belt is interconnected at one end to said first buttress and at its opposite end to said second buttress.

11. The device according to claim 9, wherein said device includes a first and second buttress respectively positioned on either side of the pavement as one end of said strip passes under and is secured to the first buttress and the other end of said strip passes under and is secured to the second buttress, the intermediate portion of said belt passing under said paved surface.

12. A pavement edging system comprising a pair of buttresses, said buttresses each having a horizontal bottom wall including longitudinally extending innermost and outermost terminal edges, a vertical front wall attached to said bottom wall offset from said innermost terminal edge to provide said bottom wall with an apron forward of said front wall and a vertical rear wall attached to said bottom wall at said outermost terminal edge, said pair of buttresses being positioned with one of said buttresses on each side of said pavement so that said apron is located below said pavement and said vertical front wall abuts an edge of said pavement and said rear wall abuts against backfill, said buttresses each including means located between said front and rear walls for maintaining said front and rear walls vertical.

13. The system according to claim 12, wherein each said apron has a portion relieved of material along its length, permiting each said buttress to flex and bow.

14. The system according to claim 13, wherein each said bottom wall is provided with a plurality of spaced through slots along the length thereof.

15. The system according to claim 14 including an anchoring strip having a plurality of through-slots along its length, said strip being adapted to be placed with its ends located beneath said buttresses and its mid section below said pavement with said slots in said strip being in alignment with said slots in said bottom walls, and stake means passing through said aligned slots for securing said buttresses.

* * * * *